United States Patent
Roof et al.

(10) Patent No.: US 8,503,733 B2
(45) Date of Patent: Aug. 6, 2013

(54) SHOW-THROUGH MEASUREMENT SYSTEM AND METHOD FOR INKS ON MEDIA

(75) Inventors: Bryan J. Roof, Newark, NY (US); Frank J. Bonsignore, Rochester, NY (US); Phillip S. Crispino, Webster, NY (US); Jacques K. Webster-Curley, Perry, NY (US)

(73) Assignee: Xerox Corporation, Norwalk, CT (US)

( * ) Notice: Subject to any disclaimer, the term of this patent is extended or adjusted under 35 U.S.C. 154(b) by 933 days.

(21) Appl. No.: 12/618,988

(22) Filed: Nov. 16, 2009

(65) Prior Publication Data

US 2011/0116110 A1  May 19, 2011

(51) Int. Cl.
*G06K 9/00* (2006.01)

(52) U.S. Cl.
USPC .......................................... 382/112; 382/141

(58) Field of Classification Search
None
See application file for complete search history.

(56) References Cited

U.S. PATENT DOCUMENTS

| | | | | |
|---|---|---|---|---|
| 5,412,485 A * | 5/1995 | Kashiwagi | ..................... | 358/441 |
| 5,515,448 A * | 5/1996 | Nishitani | ..................... | 382/106 |
| 5,835,634 A * | 11/1998 | Abrams | ..................... | 382/222 |
| 5,973,792 A * | 10/1999 | Matsuda | ..................... | 358/448 |
| 6,101,283 A * | 8/2000 | Knox | ..................... | 382/254 |
| 6,227,725 B1 * | 5/2001 | Ancin et al. | ..................... | 358/1.9 |
| 6,459,495 B1 * | 10/2002 | Silverbrook | ..................... | 358/520 |
| 6,807,301 B1 * | 10/2004 | Tanaka | ..................... | 382/169 |
| 6,862,117 B1 * | 3/2005 | Ford et al. | ..................... | 358/475 |
| 6,995,874 B1 * | 2/2006 | Cullen et al. | ..................... | 358/3.26 |
| 7,043,078 B2 * | 5/2006 | Guleryuz | ..................... | 382/180 |
| 7,064,863 B2 * | 6/2006 | Fukuda et al. | ..................... | 358/1.9 |
| 7,145,697 B1 * | 12/2006 | Sharma et al. | ..................... | 358/3.26 |
| 7,158,688 B2 * | 1/2007 | Nako et al. | ..................... | 382/275 |
| 7,274,486 B2 * | 9/2007 | Takahashi et al. | ..................... | 358/1.9 |
| 7,295,349 B2 * | 11/2007 | Mizes et al. | ..................... | 358/3.26 |
| 7,636,492 B2 * | 12/2009 | Maurer | ..................... | 382/274 |
| 7,773,273 B2 * | 8/2010 | Jeong | ..................... | 358/474 |
| 8,316,437 B2 * | 11/2012 | Joffray | ..................... | 726/20 |
| 2001/0033688 A1 * | 10/2001 | Taylor | ..................... | 382/181 |
| 2002/0067850 A1 * | 6/2002 | Williams et al. | ..................... | 382/170 |
| 2002/0071131 A1 * | 6/2002 | Nishida | ..................... | 358/1.9 |
| 2002/0146176 A1 * | 10/2002 | Meyers | ..................... | 382/218 |
| 2003/0002745 A1 * | 1/2003 | O'Hara et al. | ..................... | 382/254 |
| 2003/0218781 A1 * | 11/2003 | Suino | ..................... | 358/3.26 |

(Continued)

OTHER PUBLICATIONS

Sharma, G., Show-Through Cancellation in Scans of Duplex Printed Documents, 2001, IEEE Transactions on Image Processing, vol. 10, No. 5, pp. 736-754.*
Bianco, G., Bruno, F., Tonazzini, A., Salerno, E., and Console, E., Recto-verso registration, enhancement and segmentation of ancient documents, 2009, 15th International Conference on Virtual Systems and Multimedia, pp. 131-136.*

*Primary Examiner* — Stephen R Koziol
*Assistant Examiner* — Jonathan S Lee
(74) *Attorney, Agent, or Firm* — MH2 Technology Law Group LLP

(57) ABSTRACT

Systems and methods of measuring an amount of show-through in a printed document are disclosed. The systems and methods include an imaging device that scans a back side of the printed document and scans a front side of the printed document with a blank document disposed thereon. The imaging device produces bitmaps related to the scans and calculates bit depths associated with the bitmaps. A difference array is calculated based on the differences between the bitmaps of the back side and front side scans, and the average value and standard deviation of the difference array is calculated. The amount of show-through of the document is measured based on a formula with the calculated average and standard deviation.

20 Claims, 5 Drawing Sheets

U.S. PATENT DOCUMENTS

| | | |
|---|---|---|
| 2006/0132854 A1* | 6/2006 | Bokelman et al. ............ 358/448 |
| 2006/0181749 A1* | 8/2006 | Browne et al. ................ 358/509 |
| 2006/0215231 A1* | 9/2006 | Borrey et al. ................. 358/448 |
| 2006/0263125 A1* | 11/2006 | Gardner et al. ............... 399/364 |
| 2007/0086058 A1* | 4/2007 | Ordentlich et al. .......... 358/3.26 |
| 2009/0161124 A1* | 6/2009 | Tamura .......................... 358/1.1 |
| 2009/0171916 A1* | 7/2009 | Kirk et al. ......................... 707/3 |
| 2009/0190181 A1* | 7/2009 | Ohkawa ........................ 358/3.23 |
| 2009/0262402 A1* | 10/2009 | Fan et al. ....................... 358/488 |
| 2009/0279744 A1* | 11/2009 | Zimmerman ................. 382/112 |
| 2010/0110470 A1* | 5/2010 | Teshima ........................ 358/1.14 |
| 2010/0134850 A1* | 6/2010 | Matsuzaki .................... 358/448 |

\* cited by examiner

SHOW-THROUGH MEASUREMENT SYSTEM AND METHOD FOR INKS ON MEDIA

FIELD OF THE INVENTION

This invention relates to the field of printing and imaging devices, and more particularly to systems and methods for measuring the amount of ink show-through on printed media.

BACKGROUND OF THE INVENTION

In most ink jet printers, piezoelectric and similar print heads eject ink onto print documents or substrates. Some print heads eject UV-curable gelated inks, or similar inks that have a high viscosity at room temperature and a low viscosity when heated. The print heads heat the ink until the ink is liquid, and fire the ink droplets from the print head onto a document or other substrate, such as plain or coated paper. Once the ejected ink contacts the substrate, the ink changes from the low viscosity liquid back to a more viscous consistency. However, there can be a period of time when the ink is substantially liquid and can flow into the fibers of the substrate. Several factors related to the substrate can affect how much ink flows into the substrate fibers such as, for example, pore size, formation index, basis weight, and other factors. If the ink penetration is severe enough, ink can be seen from the back side of the substrate, a condition known as show-through. When a substrate has too much show-through, the substrate can be unacceptable for duplex printing.

Various systems and methods exist that attempt to minimize the show-through condition. For example, cooling the substrate at the time of printing can arrest the flow of ink. However, cooling can use a lot of energy and can create other down-stream issues. Further, depending on the type of substrate used, mitigation of show-through may not be needed because show-through may not be an issue, and therefore cooling the substrate would be a waste of energy.

Various systems and methods also exist that attempt to measure the amount of show-through on a substrate. For example, a densitometer can measure the degree of darkness of a material, and in particular the back (non-printed) side of a substrate. In particular, the densitometer is a light source that can be aimed at a photoelectric cell, and can determine the density of a sample placed between the light source and the photoelectric cell. However, the densitometer measurements are inherently limited due to the size of the aperture of the densitometer. As such, the densitometer is not a device that is well-suited to capture variation in show-through because elements such as paper formation differences can be larger in scale and/or location than the aperture.

A need, therefore, exists for systems and methods to effectively and efficiently calculate and measure the amount of show-through on a printed document. In particular, a need exists for systems and methods whereby the amount of show-through of a document can be given a quantitative value that can be later used to modify parameters to improve performance without using excessive amounts of energy, while simultaneously increasing yield.

SUMMARY OF THE EMBODIMENTS

The following presents a simplified summary in order to provide a basic understanding of some aspects of one or more embodiments of the invention. This summary is not an extensive overview, nor is it intended to identify key or critical elements of the invention nor to delineate the scope of the invention. Rather, its primary purpose is merely to present one or more concepts in simplified form as a prelude to the detailed description presented later.

In accordance with the present teachings, a method of measuring show-through of a printed document is provided. The method comprises forming a digital image of a back side of the printed document and forming a digital image of a front side of the printed document with a substrate disposed thereon. A back side bit depth array from the back side digital image and a front side bit depth array from the front side digital image are determined. The method further comprises comparing the back side bit depth array to the front side bit depth array, and determining a show-through of the printed document based on the comparison.

In accordance with the present teachings, a device for measuring show-through of a printed document is provided. The device comprises a scanner configured to form a digital image of a back side of the printed document and form a digital image of a front side of the printed document with a substrate disposed thereon. The device further comprises a processor configured to determine a back side bit depth array from the back side digital image and a front side bit depth array from the front side digital image, compare the back side bit depth array to the front side bit depth array, and determine a show-through of the printed document based on the comparison.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts.

Various embodiments provide systems and methods for measuring the amount of show-through of inks on printed documents and media. It should be appreciated that a multi-function imaging device can be used in the present embodiments. The multi-function imaging device can comprise a scanner, printer, copier, fax, and other features used in imaging operations. In embodiments, the printer of the imaging device can be an ink jet printer and can comprise a print head such as a piezoelectric print head. It should be appreciated that other similar imaging devices, printers, and print heads can be used in the present embodiments.

In embodiments, a scanner of the imaging device can be used to scan various configurations of a printed document or substrate, for example the printed side of the document, the back side of the document, and a configuration with one or more sheets of paper between the scanner and the document. In embodiments, the scanner can be a part of the imaging device or can be a separate entity. Further, in embodiments, the printed document can be printed by the imaging device, or can be printed by any other printer and transported to the scanner for scanning. The imaging device can be implemented to automatically scan documents after the documents are printed. Further, the systems and methods can be implemented with a transport system that can automatically and/or mechanically transport documents from the printer to the scanner, and to other portions or areas of the imaging device.

The systems and methods described herein can measure the amount of show-through of a printed document. In embodiments, the amount of show-through can be a quantitative value that can be later used in research and development areas to modify parameters associated with an imaging device, leading to an improvement in performance metrics without using excessive amounts of energy. Further, the resulting systems and methods can increase printing yield and reduce duplex printing errors.

Figure 1A:
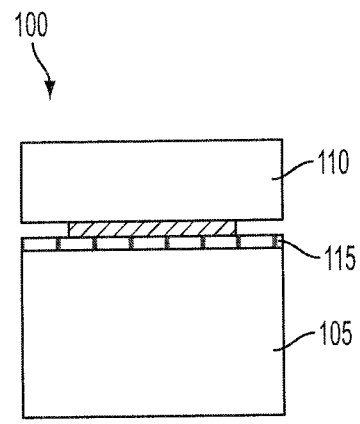
FIGS. 1A and 1B depict exemplary setups of an imaging device configured to scan a printed document according to the present teachings.
Figure 1B:
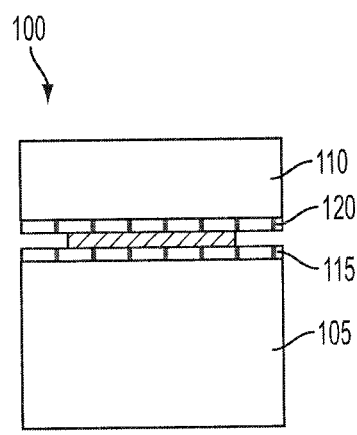

Referring to FIGS. 1A and 1B, depicted is a scanner system 100 of an imaging device configured to scan printed documents and other substrates. The scanner system 100 can comprise a scanner 105 and a backer 110. The scanner 105 can comprise conventional components of a scanner, such as a scan head and a scanning light source (scan bar) which can comprise a wide spectrum lamp such as a fluorescent or xenon lamp, or a multiple color light emitting diode (LED) emitter array which can provide sufficient illumination of a previously printed or imaged page to allow the device to copy the printed page to a blank transient document or to an electronic file. For example, the scanning light source can provide a visible light wavelength in the range of about 400 nm to about 700 nm and at an intensity sufficient to illuminate the document for copying.

The backer 110 can be positioned near the scanner 105 such that a document 115 can be disposed between the backer 110 and the scanner 105. It should be appreciated, however, that other configurations for scanning a document are envisioned. In certain embodiments as shown in FIG. 1A, the document 115 can be disposed such that a back side of the document 115 can be the side that is scanned. In particular, as depicted in FIG. 1A, the scanner 105 can scan the back side of the document 115 to measure an amount of show-through of an image printed on the front side of the document 115. The configuration as depicted in FIG. 1A can hereinafter be referred to as a "back side scan" of the document 115.

As shown in FIG. 1B, the document 115 can be disposed between the backer 110 and the scanner 105. In certain embodiments shown in FIG. 1B, an additional document 120 can be disposed between the backer 110 and the scanner 105 such that the scanner 110 can scan a front side of the document 115 with the additional document 120 covering or disposed on the front side of the document 115. As such, the scanner 100 can scan the front side of the document 115 with the additional document 120 disposed thereon to measure how much of the printed image on the front side of the document 115 is visible through the additional document 120. The configuration as depicted in FIG. 1B can hereinafter be referred to as a "through sheet scan" of the document 115.

A photodetector (not shown in figures) of the scanner 105 can produce a digital image resulting from the back side and through sheet scans of the document 115 in the form of a bitmap represented by multiple bits of tonal information, usually between 2 to 8 (or more) bits per pixel. For example, a grayscale bitmap can comprise 8 bits per pixel, resulting in 256 tonal options. The tones of a greyscale image with a bit depth of 8 ranges from 0 (black) to 255 (white) as well as the 254 in-between shades of gray. In the present embodiments, the photodetector of the scanner 105 can detect grayscale images with a bit depth of 8, however it should be understood that different digital images with different bit depths can be employed with the systems and methods described herein. Further, it should be understood that many variants are possible to produce a color digital image, such as an red-green-blue (RGB) colormap.

In obtaining the through sheet and back side scans, the scanner 105 can scan the document 115 at a resolution of, for example, 600 dots per inch (dpi), or other values. Further, in collecting the gray levels of the pixels, the scanner 105 can have an aperture of, for example, 1000×1000 pixels, or other values. The gray values can be collected for each corresponding pixel of the document 115 in the aperture. For example, if the aperture is 1000×1000 pixels, then the scanner 105 can calculate 1,000,000 gray values associated with a 1,000,000-value bitmap.

Figure 2A:
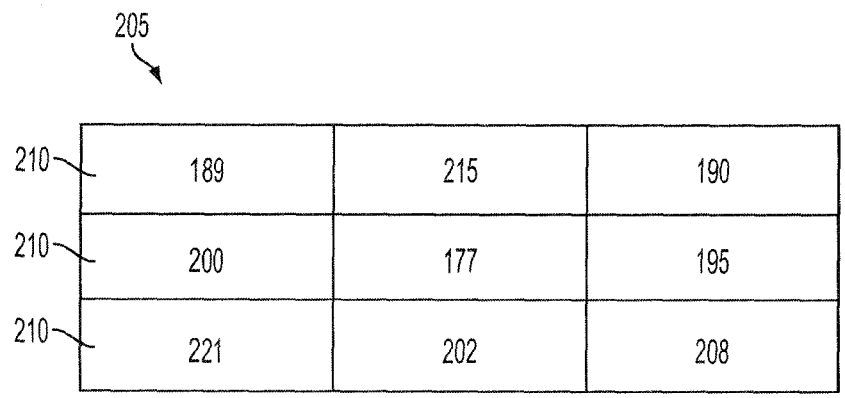
FIGS. 2A-2C depict exemplary bitmaps of printed documents according to the present teachings.
Figure 2B:
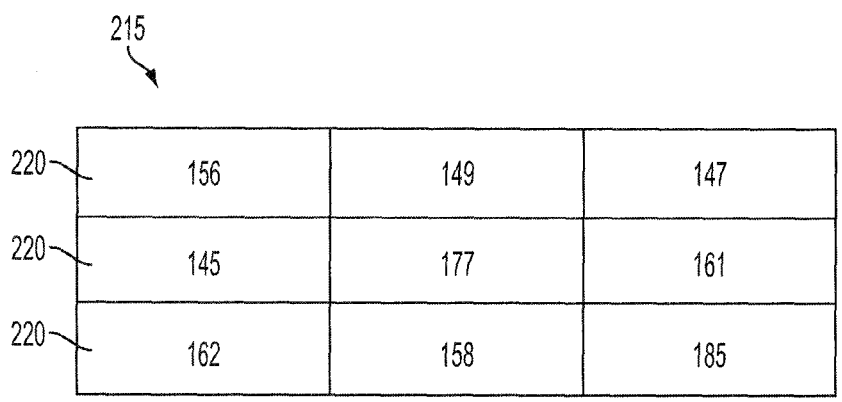

Referring to FIGS. 2A and 2B, depicted are exemplary bitmaps of a document produced from scanning the document. In particular, FIG. 2A depicts a bitmap 205 of an exemplary through sheet scan of a document, and FIG. 2B depicts a bitmap 215 of an exemplary back side scan of the document. In embodiments, the bitmaps 205, 215 depicted in FIGS. 2A and 2B can be produced by a scanner and components thereof, as described herein. It should be appreciated that bitmaps can be digital files of any size, and that the bitmaps 205, 215 depicted in FIGS. 2A and 2B are merely exemplary representations of the digital files.

As depicted in FIGS. 2A and 2B, the bitmaps 205, 215 each have associated grids 210 and 220, respectively. In particular, the bitmaps 205, 215 each have nine (9) associated grids 210, 220 that can represent pixels of the scanned document. For example, if a document has an associated 1,000,000-pixel bitmap, each grid 210, 220 can represent one of those pixels. Further, the grids 210, 220 can each have an associated bit depth. For example, the bit depth in the top left grid 210 of the bitmap 205 in FIG. 2A is 189, and the bit depth of the top left grid 220 of the bitmap 215 in FIG. 2B is 156. Stated differently, the bit depth of the corresponding pixel (top left grid 210) of the through sheet scan (bitmap 205) is greater, and closer to white, than is the bit depth of the corresponding pixel (top left grid 220) of the back side scan (bitmap 215). A greater bit depth in the through sheet scan can indicate an amount of show-through in the corresponding pixel of the printed document because the back side scan detects a darker pixel than does the through sheet scan.

Figure 2C:
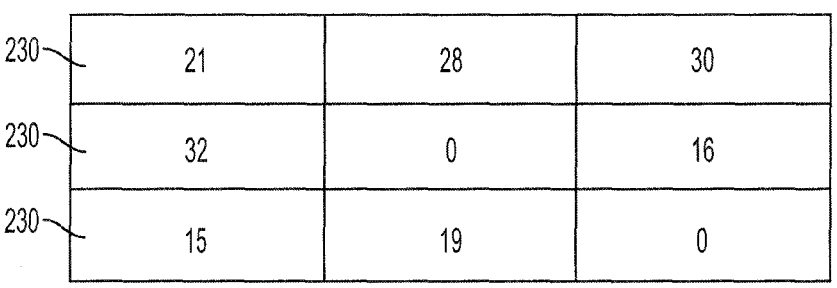

Referring to FIG. 2C, depicted is a difference array 225 comprising grids 230 containing the difference in values of the bitmaps 205, 215 as depicted in FIGS. 2A and 2B. More particularly, FIG. 2C depicts the difference array 225 of values resulting from subtracting the values of the back side bitmap 215 from the minimum value of the through sheet bitmap 205. In preferred embodiments, if one of the values in the back side bitmap 215 is greater than the minimum value of the through sheet bitmap 205, then a value of zero will be recorded as the value in the corresponding grid 230 of the difference array 225. A reasoning is that changes in opacity due to paper formation can result in a lesser bit depth in the through sheet scan grid 220. In embodiments, the difference array 225 values can be calculated by the equation {if(bitmap 215>=min(bitmap 205), min(bitmap 205)−bitmap 215, 0)}.

For example, as shown in FIG. 2A, the minimum bit depth value in the through sheet bitmap 205 is in the middle grid 210, namely, the value 177, which can be used as the reference point for the calculation of the difference array 225. For further example, the value of the top left grid 230 in the difference array 225, namely, 21, can be calculated by subtracting the value of the top left grid 220 in the back side bitmap 215, namely, 156, from the minimum bit depth value in the through sheet bitmap 205, namely, 177. The remainder of the grids 230 of the difference array 225 can be calculated in a similar manner. The values in the difference array 225 can therefore, overall, be a representational map of how much show-through there is in the back side of the printed document.

In embodiments, a standard document with a fiduciary marker can be used as a point of reference to line up the pixel aperture of the through sheet and back side scans. For example, the fiduciary marker can be located in the same place on printed documents, or can be a mark or a set of marks in a reticle of the scanner.

In embodiments, the present systems and methods can compile the values in the difference array 225 and calculate the average value in the difference array 225 using conventional systems and methods. Further, the systems and methods can calculate the standard deviation of the values in the difference array 225. It should be understood that the calculations can be for any number of values. For example, the imaging device can take a random sample of 100 values in the difference array 225 and calculate the average value and standard deviation of those 100 random values. The calculated average and standard deviation of the values in the difference array 225 can be stored in a storage device such as a hard drive, database, or any other type of memory. Further, the values of the difference array 225, the through sheet bitmap 205, and the back side bitmap 215 can be similarly stored in any suitable device. In embodiments, the storage device can be a standalone entity or can be part of a scanner, an imaging device, or any other device.

Figure 3:
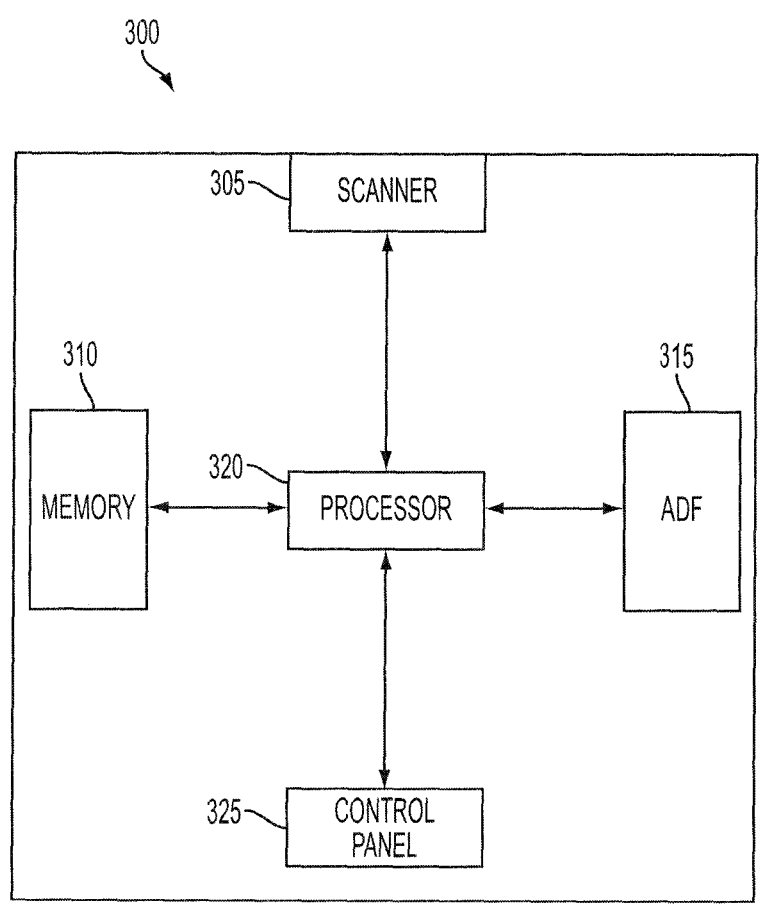
FIG. 3 depicts an exemplary hardware diagram of an imaging device according to the present teachings.

FIG. 3 depicts an exemplary block diagram of an imaging device 300. The imaging device 300 generally refers to a dual-mode imaging device that can print, copy, fax, scan, and perform similar operations. However, it should be appreciated that the imaging device 300 can be a standalone device capable of handing the functions associated with scanning documents. Generally, these devices also include a network connection, either a local area connection (LAN) such as an Ethernet interface, or a modem that can connect to a phone line (not shown in figures).

The imaging device 300 can comprise a scanner 305, a memory 310, and an automatic document feeder (ADF) 315. The scanner 305 can allow the imaging device 300 to scan hard copy original documents, generate bitmap images of the documents, save the documents and bitmap images in the memory 310, produce a printed copy of the original images via a printer, and/or other functions known in the art. The ADF 315 can transport pages of documents throughout the imaging device 300. For example, the ADF 315 can transfer a document from a printer output tray to the scanner 305.

The imaging device 300 can further comprise a processor 320 that can direct the functions of the imaging device 300 as described herein. For example, the processor 320 can obtain or retrieve bitmap data from the scanned document via the scanner 305. Further, the processor 320 can access the memory 310 to retrieve data such as values of the bitmaps and arrays in accordance with the present embodiments.

The processor 320 can be coupled to a control panel 325 comprising, for example, a touchpad or series of buttons which can allow a user a control and a user-readable setup and status screen. In use, the user can select one or more functions from a number of different functions provided by the imaging device 300 through the use of the control panel 325. For example, the user can select to measure the show-through of a document via the control panel 325.

The processor 320 can be configured to calculate functions associated with the bitmap data of the scanned documents. For example, the processor 320 can calculate what will be referred to herein as a penalty function. In embodiments, the penalty function can be a representation of the amount of show-through of a printed document. In embodiments, the penalty function, or show-through, can be calculated using (1):

$$\text{Show-through} = -\log(\text{scale\_factor}/(\text{mean}(\text{differencearray})^2 + \sigma(\text{differencearray})^2)) \quad (1)$$

wherein differencearray is the difference array 225 calculated as described herein, mean(differencearray) is the average value of the difference array 225, σ(differencearray) is the standard deviation of the difference array, and scale_factor can be any number of an operator or another entity's choosing. For example, scale_factor can be any number in a range of, for example, 0.1 to 100.0. In embodiments, the mean (differencearray) and/or σ(differencearray) can have an associated scale_factor, which can be any number in a range of, for example, 0.1 to 100.0.

More particularly, as either the calculated average or standard deviation values of the difference array 225 become larger, the penalty function likewise becomes larger. Expressed differently, a large standard deviation or a large average value associated with the difference array 225 can contribute to a large amount of show-through. For example, it would be objectionable if the back side of a printed document comprised a large uniformly dark area, thereby resulting in a large average in the difference array 225. Similarly, it would be objectionable if the back side of a printed document comprised a few scattered regions of darkness, which can indicate that the mean is low, but the standard deviation high. Printed substrates that have an objectionable back side can limit the usefulness of duplex printing and can be deemed unacceptable for duplex printing.

The processor 320 can further direct the ADF 315 to transport a document to other portions, trays, areas, and the like of the imaging device 300. For example, if a document has a large penalty function, then it can be deemed to be unacceptable for duplex printing, and the processor 320 can direct the ADF 315 to transport the document to an output tray such that the document can be retrieved by a user. For further example, if a document has a small penalty function, then it can be deemed to be acceptable for duplex printing, and the processor 320 can direct the ADF 315 to transport the document to a tray for duplex printing.

Figure 4:
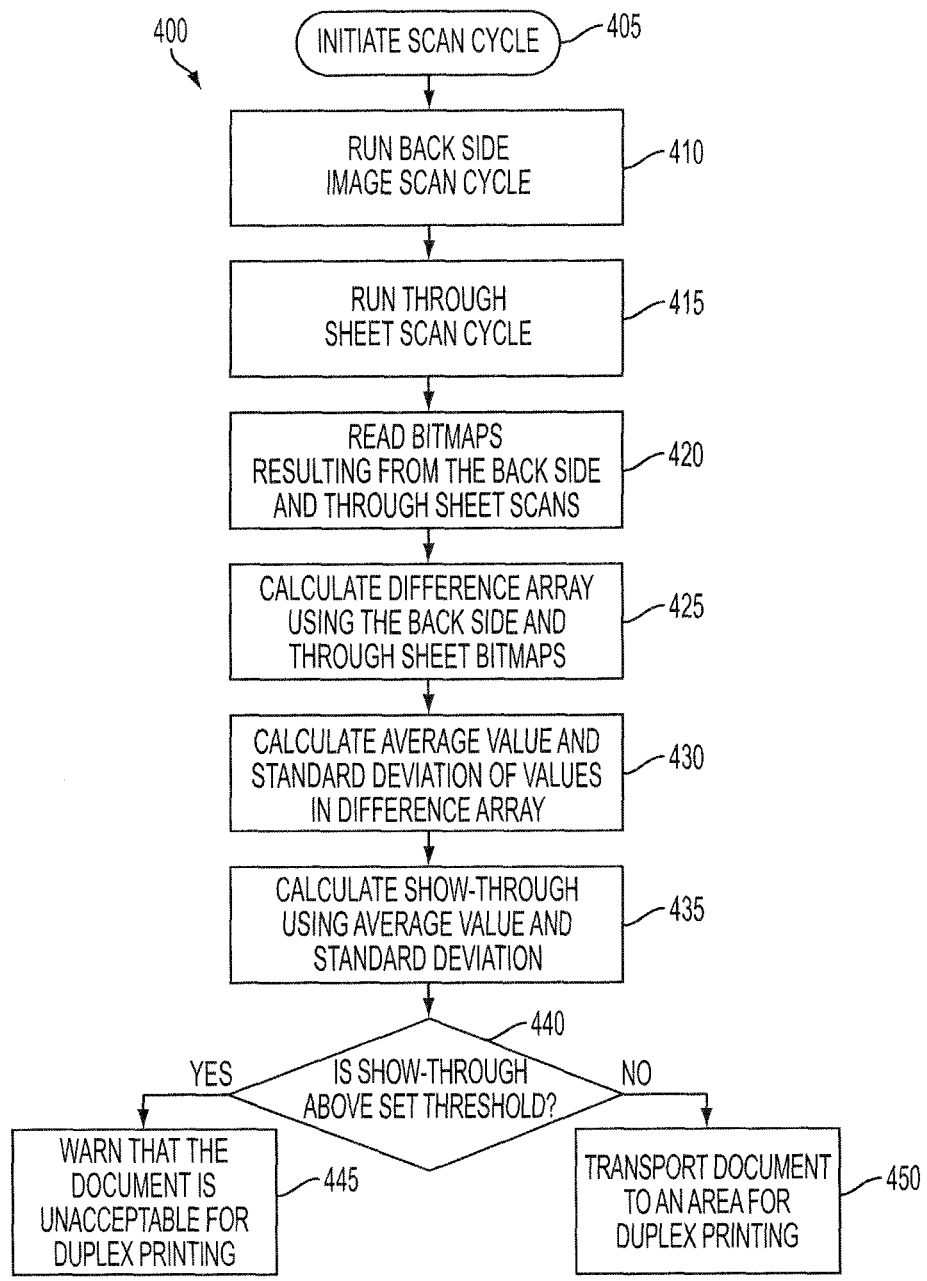
FIG. 4 depicts an exemplary flow diagram of measuring the amount of show-through of a document according to the present teachings.

Referring to FIG. 4, a present embodiment for an exemplary method 400 for measuring the show-through of a printed document is depicted. It should be appreciated that the mechanical and electronic components of the imaging device 300 as described with respect to FIG. 3 can perform the steps of the method 400 such as, for example, the processor 320, the scanner 305, the memory 310, the ADF 315, and other components.

In 405, a scan cycle of a document can initiate. In embodiments, the scan cycle can be any system or method of scanning a printed document or other medium, consistent with the embodiments discussed herein. The scan cycle can initiate when a document is located in an appropriate tray or area of an imaging device or scanner. Further, the scan cycle can initiate with a user of the imaging device selects a scan function via a control panel or similar feature of the imaging device.

In 410, a back side image scan cycle can be run. In embodiments, the imaging device can scan the back side of a printed document consistent with the systems and methods described herein. In 415, a through sheet image scan cycle can be run. In embodiments, the imaging device can scan the front side of the printed document with a blank document or other substrate disposed therebetween, consistent with the systems and methods described herein. Further, in embodiments, the back side and through sheet scans can produce resulting bitmaps of the scans.

In 420, the imaging device can read image bitmaps resulting from the back side and through sheet scans. In embodiments, the image bitmaps can be in 256 bit grayscale. For example, every pixel of the image bitmap can have 8 bits of storage resulting in 256 different bit depths, 0 to 255, each corresponding to a gray level, as explained herein. The imaging device can obtain the bit depths of each pixel on the document and store the bit depths in memory. In embodiments, the bitmaps comprising the corresponding bit depths can be stored as arrays. In further embodiments, other systems and methods to obtain image properties of a document can be employed such as, for example, obtaining a 24-bit color bitmap.

In 425, the imaging device can calculate a difference array using the back side and through sheet scan bitmaps. In embodiments as described herein, the difference array can be a result of the minimum value of the through sheet bitmap minus the values of the back side bitmap. Further, the difference array can have a value of zero for corresponding values of the back side bitmap that are greater than the minimum value of the through sheet bitmap.

In 430, the imaging device can calculate an average value and a standard deviation from the values of the difference array, according to the embodiments described herein. In embodiments, a processor of the imaging device can retrieve the difference array of a corresponding document from memory to calculate the average value and standard deviation. It should be understood that the calculations can be for any number of values. For example, the processor can retrieve a random sample of 100 values in the difference array and calculate the average value and standard deviation of those 100 random values.

In 435, the imaging device can calculate a show-through of the document using the calculated average value and standard deviation. In embodiments, the show-through can be calculated using (1), as described herein, or using other calculations. In 440, the imaging device can compare the calculated show-through to a set threshold. It should be understood that the show-through threshold can be set to any number of a user or operator's choosing. For example, the user or operator of the imaging device can set a threshold for the show-through such that any value above the threshold indicates a document that is unacceptable for duplex printing.

If the show-through is above the set threshold, the process can continue to 445, where the imaging device can warn that the document is unacceptable for duplex printing. For example, if the set threshold is 4, and the calculated show-through is 5, then the document can be unacceptable for duplex printing. In embodiments, the imaging device can warn a user, operator, or any other person or entity of the unacceptability. Further, in embodiments, the imaging device can modify or change its printing conditions to attempt to reduce the amount of show-through, such as, for example, changing a speed of the ink ejection process, or other modifications.

If, however, the show-through is at or below the set threshold, the process can continue to 450 where the imaging device can transport the document to a proper area for duplex printing. For example, if the set threshold is 4, and the calculated show-through is 3.5, then the document can be acceptable for duplex printing. In embodiments, the imaging device can inform a user, operator, control panel, or any other person or entity of the amount of show-through, can mark the document in some way to indicate that the document is eligible for duplex printing, or can transport the document to other trays or areas of the imaging device. In further embodiments, the document can be transported via an ADF or other transport features.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of measuring show-through of a printed document, comprising:
    forming a digital image of a back side of the printed document;
    forming a digital image of a front side of the printed document with a substrate disposed thereon;
    determining a back side bit depth array from the back side digital image and a front side bit depth array from the front side digital image;
    comparing the back side bit depth array to the front side bit depth array, wherein the comparing comprises:
        calculating respective difference values between values of the back side bit depth array and a minimum value of the front side bit depth array; and
        calculating a mean and a standard deviation of the respective difference values; and
    determining a show-through of the printed document based on the comparing the back side bit depth array to the front side bit depth array.

2. The method of claim 1, wherein the show-through is determined by an equation:

$$\text{show-through} = -\log(\text{scale\_factor}/(\text{mean}(\text{differencearray})^2 + \sigma(\text{differencearray})^2))$$

wherein "mean(differencearray)" and "σ(differencearray)" refer to the mean and the standard deviation of the respective difference values, respectively, and wherein "scale_factor" is a number in a range of 0.1 to 100.

3. The method of claim 1, wherein the digital images of the back side and the front side of the printed document are 8-bit grayscale images.

4. The method of claim 1, further comprising:
    comparing the show-through of the printed document to a show-through threshold; and
    issuing a warning for the printed document if the show-through of the printed document is greater than the show-through threshold.

5. The method of claim 1, further comprising:
    comparing the show-through of the printed document to a show-through threshold; and
    indicating that the printed document is available for duplex printing if the show-through of the printed document is less than or equal to the show-through threshold.

6. The method of claim 1, wherein the digital images of the back side and the front side of the printed document are formed after the printed document is printed.

7. The method of claim 1, wherein the comparing the back side bit depth array to the front side bit depth array comprises:
    comparing a set number of values of the back side bit depth array to a same set number of values of the front side bit depth array.

8. The method of claim 1, further comprising:
    forming a difference array comprising the respective difference values; and
    storing the difference array in memory.

9. The method of claim 1, further comprising:
    assigning as zero a respective difference value if a value of the back side bit depth array is greater than the minimum value of the front side bit depth array.

10. The method of claim 1, further comprising:
    comparing the show-through of the printed document to a show-through threshold; and
    modifying a printing condition if the show-through of the printed document is greater than the show-through threshold.

11. A device for measuring show-through of a printed document, comprising:
    a scanner configured to form a digital image of a back side of the printed document and form a digital image of a front side of the printed document with a substrate disposed thereon; and
    a processor configured to:
        determine a back side bit depth array from the back side digital image and a front side bit depth array from the front side digital image;
        compare the back side bit depth array to the front side bit depth array by:
            calculating respective difference values between values of the back side bit depth array and a minimum value of the front side bit depth array; and
            calculating a mean and a standard deviation of the respective difference values; and
        determine a show-through of the printed document based on the comparison.

12. The device of claim 11, wherein the show-through is determined by an equation:

$$\text{show-through} = -\log(\text{scale\_factor}/(\text{mean}(\text{differencearray})^2 + \sigma(\text{differencearray})^2))$$

wherein "mean(differencearray)" and "σ(differencearray)" refer to the mean and the standard deviation of the respective difference values, respectively, and wherein "scale_factor" is a number in a range of 0.1 to 100.

13. The device of claim 11, wherein the digital images of the back side and the front side of the printed document are 8-bit grayscale images.

14. The device of claim 11, wherein the processor is further configured to:
    compare the show-through of the printed document to a show-through threshold; and
    issue a warning for the printed document if the show-through of the printed document is greater than the show-through threshold.

15. The device of claim 11, wherein the processor is further configured to:
    compare the show-through of the printed document to a show-through threshold; and
    indicate that the printed document is available for duplex printing if the show-through of the printed document is less than or equal to the show-through threshold.

16. The device of claim 11, wherein the processor forms the digital images of the back side and the front side of the printed document after the printed document is printed.

17. The device of claim 11, wherein the processor, in comparing the back side bit depth array to the front side bit depth array, is further configured to:
    compare a set number of values of the back side bit depth array to a same set number of values of the front side bit depth array.

18. The device of claim 11, wherein the processor is further configured to:
    form a difference array comprising the respective difference values; and
    store the difference array in memory.

19. The device of claim 11, wherein the processor is further configured to:
    assign as zero a respective difference value if a value of the back side bit depth array is greater than the minimum value of the front side bit depth array.

20. The device of claim 11, wherein the processor is further configured to:
- compare the show-through of the printed document to a show-through threshold; and
- modify a printing condition if the show-through of the printed document is greater than the show-through threshold.

\* \* \* \* \*